United States Patent
Yamada

(10) Patent No.: US 8,300,068 B2
(45) Date of Patent: Oct. 30, 2012

(54) MAP DISPLAY CONTROLLER FOR CONTROLLING DISPLAY OF FACILITIES AND MOVING IMAGES ASSOCIATED THEREWITH

(75) Inventor: Takushi Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1207 days.

(21) Appl. No.: 11/593,566

(22) Filed: Nov. 7, 2006

(65) Prior Publication Data

US 2007/0106464 A1    May 10, 2007

(30) Foreign Application Priority Data

Nov. 8, 2005    (JP) .................................. 2005-324133

(51) Int. Cl.
*G09G 5/00*    (2006.01)
*G08G 1/13*    (2006.01)
*G08G 1/137*   (2006.01)

(52) U.S. Cl. .................................. 345/681; 340/995.14

(58) Field of Classification Search .................. 345/474, 345/636, 684, 688, 681; 340/995.14, 995.15, 340/995.16, 995.17, 995.24, 995.27; 715/715
See application file for complete search history.

(56) References Cited

U.S. PATENT DOCUMENTS

| | | | | |
|---|---|---|---|---|
| 4,914,605 A | * | 4/1990 | Loughmiller et al. | 345/649 |
| 5,731,979 A | * | 3/1998 | Yano et al. | 701/211 |
| 6,169,552 B1 | | 1/2001 | Endo et al. | |
| 6,240,361 B1 | * | 5/2001 | Ise et al. | 701/208 |
| 6,889,138 B1 | * | 5/2005 | Krull et al. | 701/211 |
| 6,999,875 B2 | * | 2/2006 | Tu | 701/211 |
| 2003/0018427 A1 | * | 1/2003 | Yokota et al. | 701/208 |
| 2004/0243306 A1 | * | 12/2004 | Han | 701/211 |

FOREIGN PATENT DOCUMENTS

| | | |
|---|---|---|
| JP | A-11-161159 | 6/1999 |
| JP | A-2000-371955 | 11/2000 |
| JP | A-2000-337895 | 12/2000 |
| JP | A-2001-317955 | 11/2001 |
| JP | A-2003-194556 | 7/2003 |

OTHER PUBLICATIONS

JPO website machine translation of JP-A-2003-194556, Nov. 4, 2009, pp. 1-24.*

* cited by examiner

*Primary Examiner* — Jeffery A Brier
(74) *Attorney, Agent, or Firm* — Posz Law Group, PLC

(57) ABSTRACT

A vehicle navigation system is described that includes a map display controller that is able to control display of a map with facilities and moving images, including balloon icons, associated with the facilities. The moving images are controlled to move relative to the various facilities. The map display controller operates such that when a user touches a display screen of the navigation system at a particular position, moving images are controlled to be displayed as moving toward the particular position. In addition, if the user causes the map to be scrolled by an operation unit, the moving images are controlled to be displayed as moving toward a center of the map as displayed according the performed scroll.

12 Claims, 5 Drawing Sheets

MAP DISPLAY CONTROLLER FOR CONTROLLING DISPLAY OF FACILITIES AND MOVING IMAGES ASSOCIATED THEREWITH

CROSS REFERENCE TO RELATED APPLICATION

This application is based on and incorporates herein by reference Japanese Patent Application No. 2005-324133 filed on Nov. 8, 2005.

FIELD OF THE INVENTION

The present invention relates to a map display controller and a map display control program.

BACKGROUND OF THE INVENTION

Conventionally, a map display controller allows an image display apparatus to display a map and displays roads and facilities (e.g., park and building) on the map. Especially, when displaying a facility, the map display controller renders an icon, i.e., an image for the facility, at a corresponding position of the facility on the map displayed by the image display apparatus (e.g., see patent documents 1 and 2).
Patent Document 1: JP-H11-161159 A
Patent Document 2: JP-2000-317955 A
In the related art, the facility display image is fixed to the facility's position on the map. When the map scrolls in a display screen of the image display apparatus, for example, the facility image moves with the map to keep the position on the map unchanged.

SUMMARY OF THE INVENTION

The present invention has been made in consideration of the foregoing. It is therefore an object of the invention to provide a new map display technology capable of displaying a facility display image so as to be noticeable to a user.

According to an aspect of the present invention, a map display controller is provided as follows. Display control means is included for controlling an image display apparatus to display part of a map on a display screen of the image display apparatus and to display a moving image in the display screen in visual association with a certain position on the map. Movement control means is included for moving the moving image in the display screen relatively to the map.

According to another aspect of the present invention, a method for displaying a map in a display screen of an image display apparatus is provided with the following: displaying a part of the map in the display screen; displaying a moving image in the display screen in visual association with a certain position on the map; and moving the moving image in the display screen relatively to the map.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
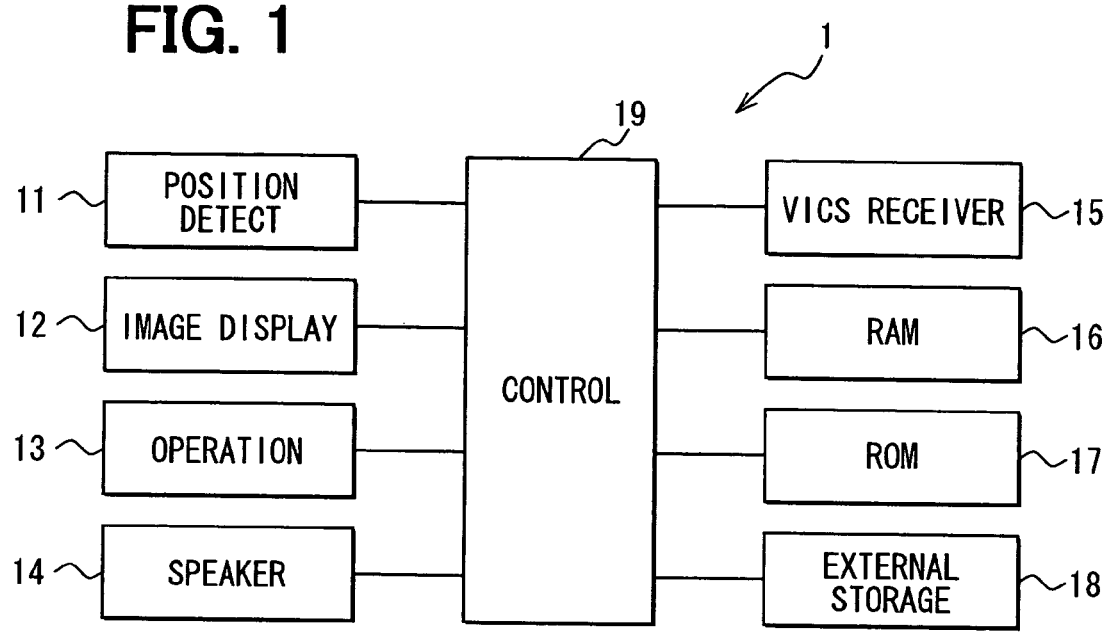
FIG. 1 is a block diagram showing a construction of a vehicle navigation system 1 according to a first embodiment of the present invention.

A first embodiment of the invention will be described. FIG. 1 shows a hardware construction of a vehicle navigation system 1 as an example according to the first embodiment. As will be described later in details, the vehicle navigation system 1, which is mounted in a subject vehicle, displays a map together with a facility icon, a balloon icon, and a rope icon. The facility icon is an image that represents a facility and is fixed to a map. The balloon icon is a balloon-shaped image representing a moving image. The rope icon is a connection image that connects the balloon icon to the facility icon. The vehicle navigation system 1 varies the gradient of the balloon icon against the facility icon in accordance with map scroll. The vehicle navigation system 1 includes a position detector 11, an image display apparatus 12, an operation unit 13, a speaker 14, a VICS receiver 15, RAM 16, ROM 17, an external storage unit 18, and a control circuit 19.

The position detector 11 includes known sensors (not shown) such as a geomagnetic sensor, a gyroscope, a vehicle speed sensor, and a GPS receiver. The position detector 11 detects information based on characteristics of these sensors for specifying the vehicle's current position and orientation and outputs the information to the control circuit 19.

While the control circuit 19 outputs a video signal, the image display apparatus 12 displays an image based on this video signal for a user. For example, the image display apparatus 12 displays an image such as a map around the current position.

The operation unit 13 accepts a user operation and supplies the control circuit 19 with a signal corresponding to the user operation. Specifically, the operation unit 13 includes multiple mechanical switches (hereafter referred to as system switches), a touch panel, a remote control device (hereafter referred to as a remote controller), and a remote controller sensor. The system switches are provided for the front of the vehicle navigation system 1. The touch panel is overlaid on the display surface of the image display apparatus 12. The remote controller accepts a user operation and transmits a wireless signal corresponding to the operation. The remote controller sensor receives the wireless signal from the remote controller. When a user presses the mechanical switch, touches the touch panel, or manipulates the remote controller, the operation unit 13 outputs signals based on these operations to the control circuit 19.

The VICS receiver 15 receives traffic congestion information, traffic regulation information, and detailed facility information wirelessly transmitted from road equipment installed along a road. The VICS receiver 15 outputs the received information to the control circuit 19.

The external storage unit 18 includes nonvolatile storage media such as DVD, CD, and HDD, and an apparatus to read and possibly write data to the storage media. The external storage unit 18 stores a program to be read and executed by the control circuit 19 and map data for route guidance.

The map data includes road data and facility data. The road data contains positions and types of links and nodes, and information about connection between nodes and links. The facility data contains multiple records for each facility. Each record contains data indicative of name information about a targeted facility, location information, facility type information, facility icon's shape information, and detailed information.

The control circuit 19, equivalent to a computer, reads programs for operations of the vehicle navigation system 1 from the ROM 17 and the external storage unit 18 and executes the programs. During program execution, the control circuit 19 reads information from the RAM 16, the ROM 17, and the external storage unit 18. The control circuit 19 writes information to the RAM 16 and the external storage unit 18. The control circuit 19 exchanges signals with the position detector 11, the image display apparatus 12, the operation unit 13, the speaker 14, and the VICS receiver 15.

The control circuit 19 executes programs to actually provide a current position specification process, a circumferential map display control process, a guiding route calculation process, and a route guidance process.

The current position specification process uses known technologies such as map matching to specify a vehicle's current position or orientation based on a signal from the position detector 11.

Based on the specified current position of the vehicle, the circumferential map display control process displays the circumferential map and the vehicle mark indicating the vehicle's current position.

The guiding route calculation process accepts user input for a destination using the operation unit 13 and calculates an optimum guiding route from the current position to the destination. Methods for accepting destination input include directly accepting input of character strings such as the address and the name of the destination and using map display. According to the map display method, the control circuit 19 allows the image display apparatus 12 to display part of the map. The control circuit 19 accepts operation to specify a facility or a position on the displayed map from the operation unit 13.

The route guidance process reads map data from the external storage unit 18 with reference to the current position specified by the current position specification process. The route guidance process overlays the calculated guiding route, destination, pass-through locations, and current position on the map represented by the map data to generate an overlaid image. The route guidance process outputs the overlaid image to the image display apparatus 12. The route guidance process allows the speaker 14 to output guidance voice for right or left turn as needed when the vehicle reaches immediately before a guided intersection.

Figure 2:
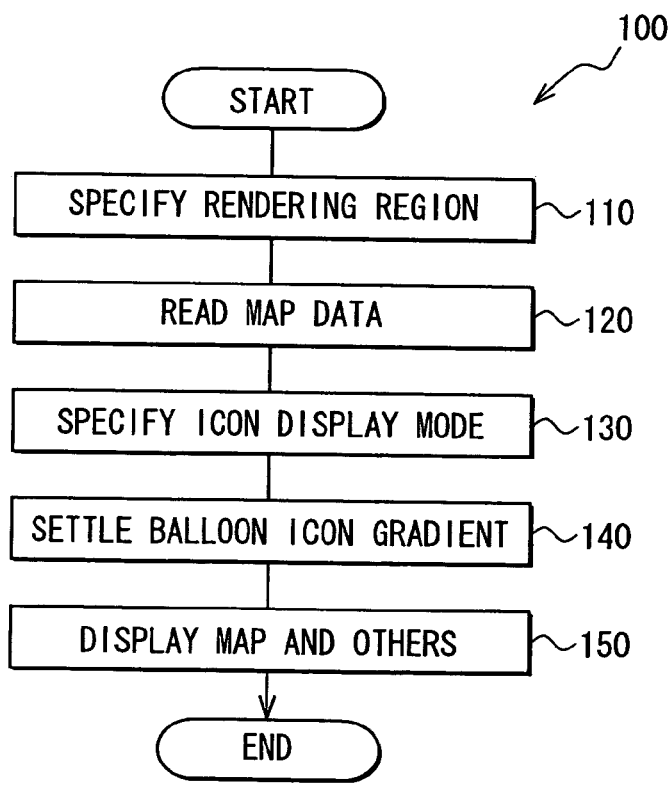
FIG. 2 is a flowchart of a map display control program according to the first embodiment.

The control circuit 19 periodically (e.g., at a 30-millisecond cycle) executes a map display control program 100 in FIG. 2 so that the image display apparatus 12 displays a map during the guiding route calculation process, the circumferential map display control process, and the route guidance process.

At Step 110 in one cycle of the map display control program 100, the control circuit 19 specifies a rendering region at Step 110. The rendering region is part of the map that is displayed on the image display apparatus 12. The control circuit 19 determines the rendering region at the present moment based on a map coordinate (hereafter referred to as a center coordinate) presently centered in the rendering region, a present map scale, and a present view window size for the map.

The RAM 16 or the HDD of the external storage unit 18 records the coordinate and the map scale at the present moment. The map's view window is an area that is a part of the entire display screen of the image display apparatus 12 and is used for map display. The RAM 16 or the HDD of the external storage unit 18 records information about the view window position and size at the present moment. The control circuit 19 can change the recorded center coordinate, map scale, view window position, and view window size based on a user's change instruction using the operation unit 13.

At Step 120, the control circuit 19 reads the specified rendering region and its vicinities of the map data from the external storage unit 18. At Step 130, the control circuit 19 specifies an icon display mode. The icon display mode specifies display of an icon in a map image to be displayed on the image display apparatus 12. The icon display modes include: (1) a mode of displaying no icons; (2) a mode of displaying a facility icon only for a predetermined facility; (3) a mode of displaying a facility icon only for a facility belonging to predetermined types (department store, park, school, theme park, and the like); and (4) a mode of displaying a facility icon for all facilities. The RAM 16 or the HDD of the external storage unit 18 records information about the currently selected icon display mode. The control circuit 19 can change the recorded icon display modes based on a user's change instruction using the operation unit 13.

At Step 140, the control circuit 19 settles a direction (hereafter referred to simply as a balloon icon gradient) from the facility icon to be used at Step 150 to the corresponding balloon icon. The control circuit 19 provides the settled balloon icon gradient for each facility in the map data read at Step 120. Specifically, the control circuit 19 reads balloon icon gradient information recorded in the RAM 16 or the external storage unit 18. Initially, the recorded gradient information approximately indicates an upward direction in the view window. The gradient information can be rewritten by a scroll control process to be described later.

At Step 150, the control circuit 19 controls the image display apparatus 12 based on results at Steps 110 through 140. The control circuit 19 allows the image display apparatus 12 to display a map based on the map data corresponding to the rendering region in the view window according to the icon display mode. The same shape may be used for all the displayed facility icons. The facility icon shape may be determined based on shape information about each icon recorded in a facility-based record in the facility data. The facility icon shape may be determined based on icon shape information for each facility type recorded in the map data. Further at Step 150, the control circuit 19 displays a set of balloon icon, flag-shaped image (hereafter referred to as a flag icon), and rope icon for each displayed facility icon. The same shape may be used for the balloon icon, the flag icon, and the rope icon to be displayed at this step. The icon shape may be determined based on shape information about each icon recorded in a facility-based record in the facility data. The icon shape may be determined based on icon shape information for each facility type recorded in the map data. The balloon icon gradient specified at Step 140 is used to determine a gradient angle for the direction from the facility icon to the corresponding balloon icon.

Figure 3:
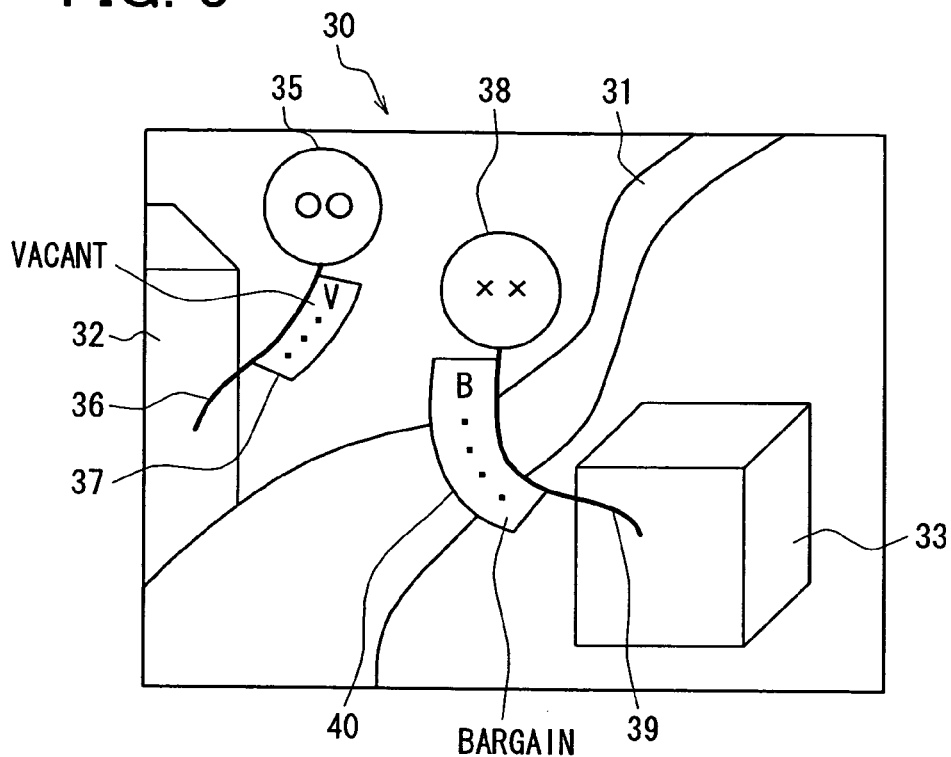
FIG. 3 exemplifies display of a map in a view window of an image display apparatus according to the first embodiment.

FIG. 3 exemplifies the map display in the view window 30 of the image display apparatus 12 according to the process at Step 150. The example in FIG. 3 uses initial gradient values for balloon icons 35 and 38. The view window 30 displays a road 31 and cubic facility icons 32 and 33 near the road 31. The balloon icons 35 and 38 are displayed above the facility icons 32 and 33, respectively.

A rope icon 36 is displayed so as to connect the balloon icon 35 with the facility icon 32. Similarly, a rope icon 39 is displayed so as to connect the balloon icon 38 with the facility icon 33. The use of the rope icons 36 and 39 visually distinctively associate the balloon icons 35 and 38 with the corresponding facility icons 32 and 33. Further, flag icons 37 and 40 are displayed along the rope icons 36 and 39. The map display in the view window 30 gives a visual effect of using an advertising balloon for each facility on the map.

The control circuit 19 displays corresponding facility names in the balloon icons 35 and 38. Further, the control circuit 19 displays corresponding detailed information in the flag icons 37 and 40. The detailed information to be displayed includes vacant parking space information, bargain sale information, event information, business hours information, and advertising information associated with the facility. The control circuit 19 receives chronologically changing information (i.e., realtime information) such as vacant parking space information, bargain sale information, and event information via the VICS receiver 15. There may be a case where the vehicle navigation system 1 can connect to a wide area network such as the Internet using wireless communication technologies such as DSRC (Dedicated Short Range Communication) and wireless LAN. In such case, the control circuit 19 may acquire the latest detailed information from the wide area network and display the acquired information in the flag icons 37 and 40.

One cycle of the map display control program 100 terminates after Step 150. By repeatedly executing the map display control program 100, the vehicle navigation system 1 can update the map to be displayed in accordance with varying rendering regions, icon display modes, and real-time information.

The circumferential map display control process or the route guidance process changes the rendering region based on a change in the vehicle's current position specified by the current position specification process. When the vehicle's current position changes, the control circuit 19 records the current position as the center coordinate for map display in the RAM 16 or the external storage unit 18. As a result, the control circuit 19 changes the rendering region so that the vehicle's position is always centered in the view window during processing of the map display control program 100.

Figure 4:
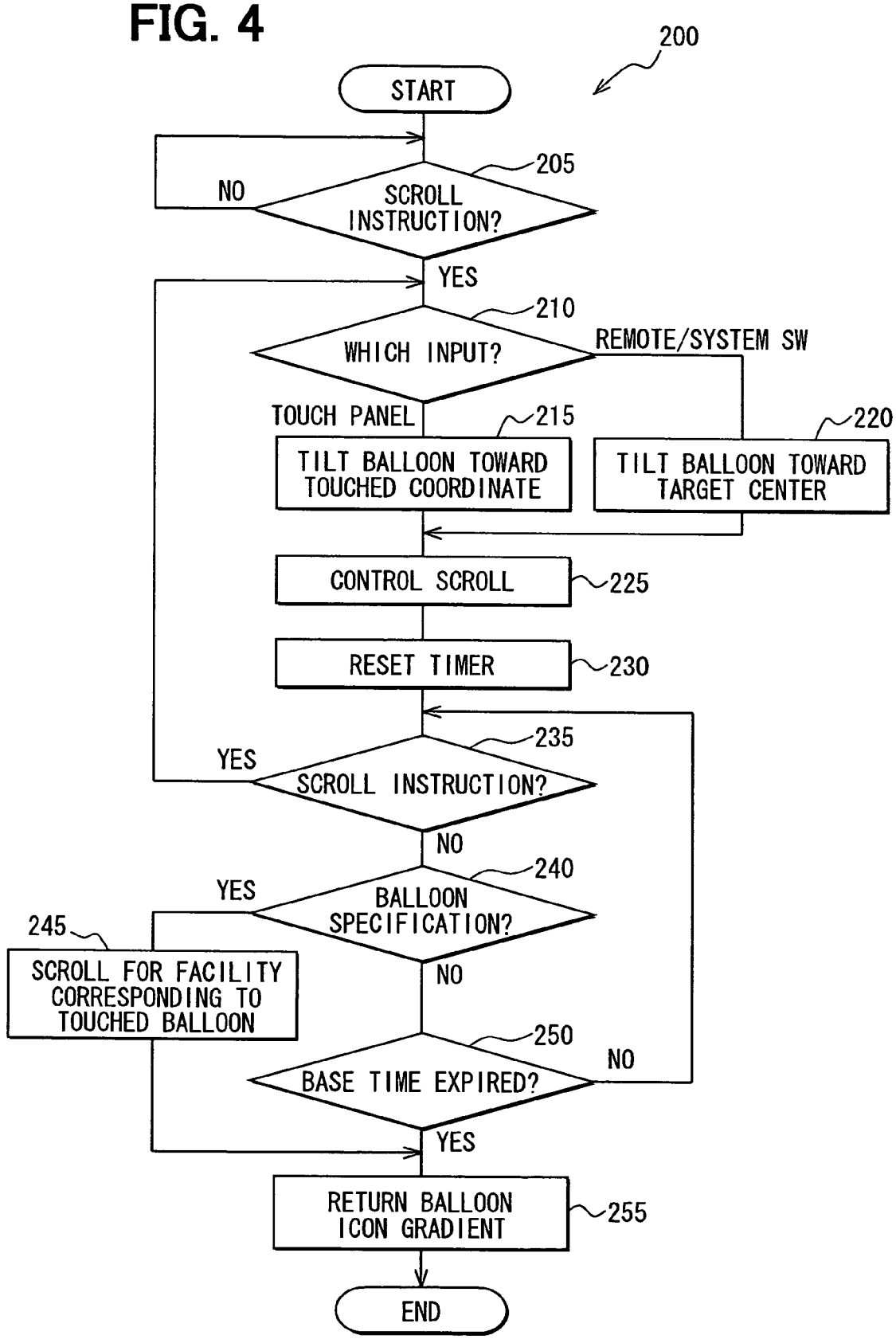
FIG. 4 is a flowchart of a scroll control program according to the first embodiment.

When a destination is input using the map display during the guiding route calculation process, the rendering region varies with a user's scroll instruction using the operation unit 13. The rendering region varies so as to move in accordance with a scroll instruction using the operation unit 13. This is referred to as scroll control. To provide this control, the control circuit 19 repeatedly executes the scroll control program 200 in FIG. 4 in parallel with repeated execution of the map display control program 100.

At Step 205 in one cycle of the scroll control program 200, the control circuit 19 waits for a user's scroll instruction using the operation unit 13. Using the operation unit 13, the user may issue a scroll instruction by touching a position corresponding to a point in the view window on the touch panel of the operation unit 13 or pressing a scroll button up, down, left, or right. The scroll button is provided for the system switch of the operation unit 13 and the remote controller.

When detecting a scroll instruction, the control circuit 19 proceeds to Step 210 to determine whether the scroll instruction is supplied from the touch panel or from the system switch and the remote controller. When the scroll instruction is supplied from the touch panel, the control circuit 19 proceeds to Step 215. When the scroll instruction is supplied from one of the system switch and the remote controller, the control circuit 19 proceeds to Step 220.

At Step 215, the control circuit 19 tilts the balloon icon toward the touched map coordinate, i.e., the map coordinate displayed at the touched position in the view window correspondingly to the touch operation. That is, the RAM 16 or the external storage unit 18 records a balloon icon gradient for each facility available in the current view window and its vicinity. The control circuit 19 changes the corresponding balloon icon gradient from the initial value to the direction to the touched map coordinate from the facility.

At Step 220, the control circuit 19 specifies a target center based on a scroll amount given to the pressed system switch and remote controller's scroll button. The target center is a map coordinate as the center of the view window after the scroll. The control circuit 19 tilts the balloon icon toward the target center in the same manner as described for Step 215.

Figure 5:
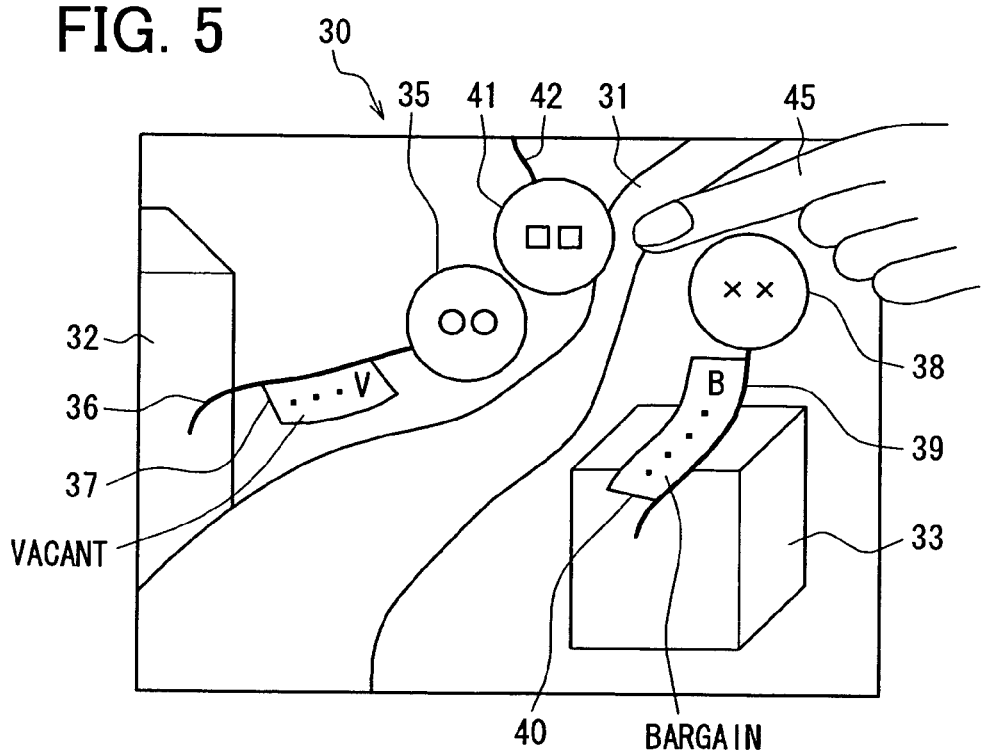
FIG. 5 shows display in a view window immediately after a finger touches a point on the view window according to the first embodiment.

Under control of Steps 215 and 220, the map display control program 100 allows the image display apparatus 12 to display the balloon icon, the rope icon, and the flag icon so that they slant to be directed toward the target center. FIG. 5 shows display in the view window 30 immediately after a finger 45 touches a point on the view window 30. In FIG. 5, the balloon icons 35 and 38 slantwise move to approach the touched coordinate from the initial positions in FIG. 3. A balloon icon 41 and a rope icon 42 correspond to a facility upward outside the view window 30 and approach the touched coordinate to move into the view window 30. Lengths of the rope icons 36, 39, and 42 may or may not change.

At Step 225, the control circuit 19 controls the scroll. Specifically, the RAM 16 or the external storage unit 18 records a center coordinate value. The control circuit 19 varies the center coordinate value from the current value to the touched map coordinate or the target center value consecutively or stepwise in small units. In this manner, the control circuit 19 executes the map display control program 100 to change the rendering region and, as a result, scroll the map in the view window. In other words, part of the map displayed in the view window moves along a given direction on the map. The scroll does not change the positions of the balloon icons 35, 38, and 41 in relation to the map.

Figure 6:
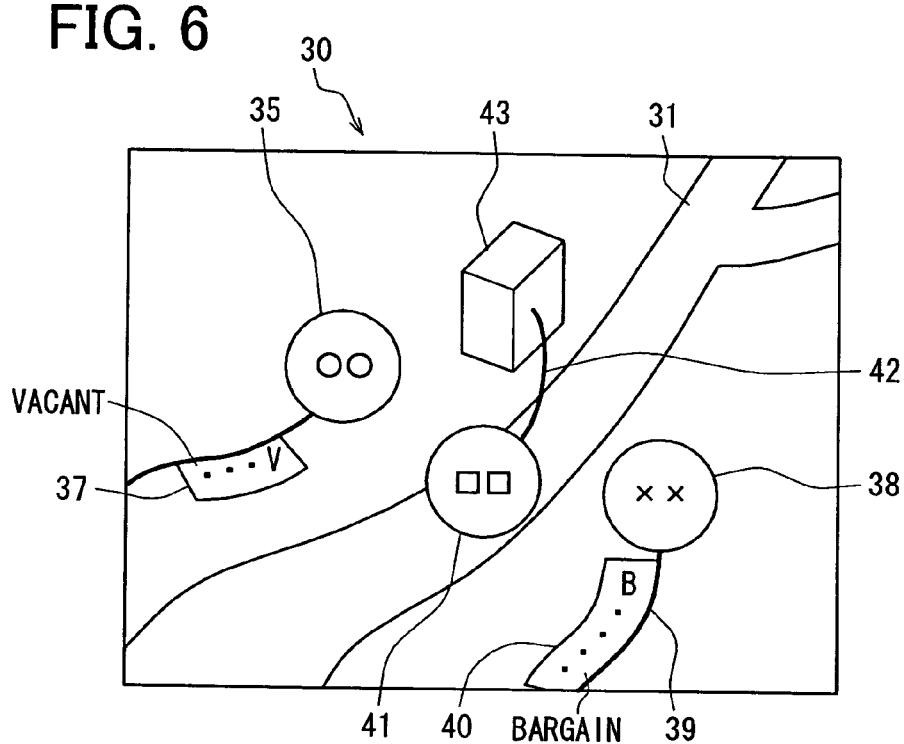
FIG. 6 shows a map scrolled to the bottom left from the map display state in FIG. 5.

FIG. 6 shows the map scrolled to the bottom left from the view in FIG. 5. While the scroll places the facility icons 32 and 33 outside the view window 30, the balloon icons 35 and 38 remain in the view window 30. The facility icon 43 corresponding to the balloon icon 41 moves to the view window 30 from the outside.

With respect to the scroll of one map, the scroll direction is reverse to the movement direction of the display. For example, scrolling the map to the right is equivalent to moving part of the map displayed in the view window to the left.

After completion of the scroll control, the control circuit 19 resets a timer at Step 230. Specifically, the control circuit 19 starts the time measurement anew.

At Step 235, the control circuit 19 determines whether or not to newly detect a user's scroll instruction using the operation unit 13. When the result is affirmative, the control circuit 19 proceeds to Step 210. When the result is negative, the control circuit 19 proceeds to Step 240.

Figure 7:
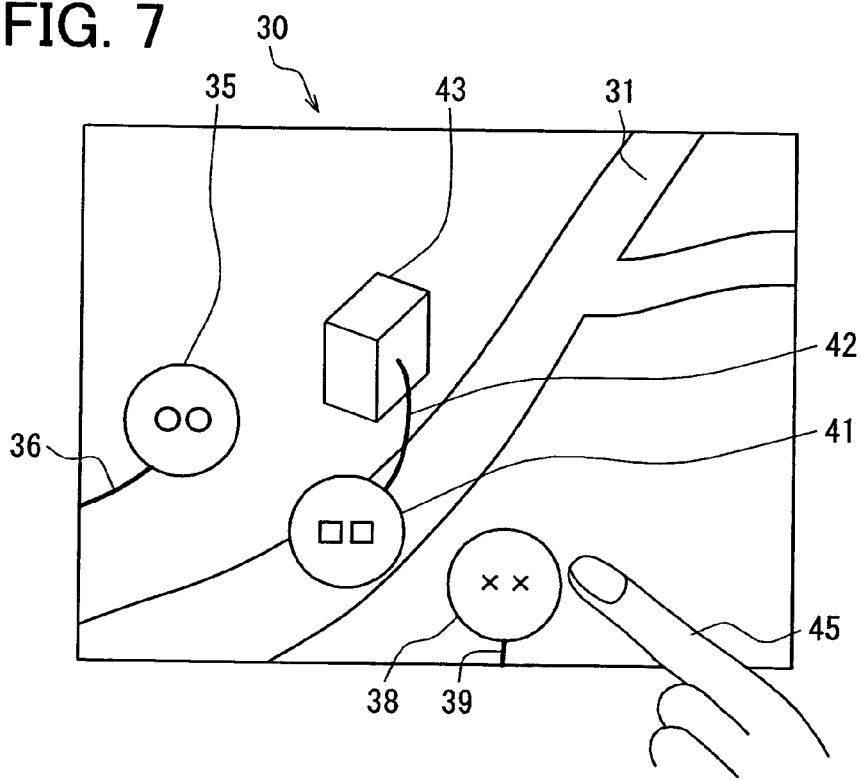
FIG. 7 shows that a finger touches a balloon icon according to the first embodiment.

At Step 240, the control circuit 19 determines whether or not to newly detect a user's balloon specification. The user's balloon specification signifies that the user uses the operation unit 13 to select one of balloon icons currently displayed in the view window. Specifically, the user's balloon specification is equivalent to touching a balloon icon display position using the touch panel or selecting a balloon icon using the system switch or the remote controller. FIG. 7 shows that the finger 45 touches the balloon icon 38 to specify it. When detecting the new balloon specification, the control circuit 19 proceeds to Step 245. When not detecting the same, the control circuit 19 proceeds to Step 250.

At Step 245, the control circuit 19 provides the scroll control with reference to a position coordinate in the map for a facility corresponding to the touched balloon icon. The position coordinate is used as the target center. Specifically, the RAM 16 or the external storage unit 18 records a center coordinate value. The control circuit 19 varies the center coordinate value from the current value to the target center consecutively or stepwise in small units. After Step 245, the control circuit 19 proceeds to Step 255.

At Step 250, the control circuit 19 determines whether or not the timer expires. Specifically, the control circuit 19 determines whether or not the time elapsed from the measurement started at Step 235 exceeds a base time. The base time may be a predetermined value, a value varying with conditions, or a random value determined within a given range. For example, the base time may increase within a range from 30 seconds to one minute as a vehicle speed obtained from the position detector 11 increases.

At Step 255, the control circuit 19 returns the balloon icon gradient to the initial state. Specifically, the RAM 16 or the external storage unit 18 records balloon icon gradients corresponding to the facilities available in the current view window and its vicinity. The control circuit 19 returns the balloon icon gradients from the current values to the initial values. Under control of the map display control program 100, the control circuit 19 allows the image display apparatus 12 to display the balloon icon, the rope icon, and the flag icon, positions of which return to the initial state before detection of the scroll instruction. After Step 255, one cycle of the map display control program 100 terminates.

While the control circuit 19 executes the scroll control program 200 as mentioned above, the vehicle navigation system 1 receives the scroll instruction through the use of the operation unit 13 (see Steps 205 and 235). The system directs the balloon icons 35, 38, and 41 to the target center for scroll determined based on the operation of the operation unit 13 (see Steps 210, 215, and 220). The system then scrolls the map (see Step 225).

When the map scrolls, all balloon icons, rope icons, and flag icons displayed in the view window move dynamically against the map. These icons easily call a user's attention compared to a road or a facility icon that move statically along with the map in the view window. That is, these icons are more noticeable to the user.

All the balloon icons displayed in the view window slant to the target center of the map display after the scroll as if they are carried on the wind toward the target center. The balloon icon moves in a direction that allows the balloon icon to easily enter the view window. The scroll control can delay the time point to cause a moving image to get out of the display screen.

The view window may display, as the balloon icon 41 in FIG. 7, a balloon icon corresponding to a facility at a map location not yet shown in the view window.

The facility corresponding to that balloon icon may be located far from the target center along the scroll direction. In this case, with reference to the display screen of the image display apparatus 12, the balloon icon moves in a direction reverse to the scroll direction or moves in the scroll direction more slowly than the map. The scroll in this embodiment can remain the balloon icon in the display screen as long as possible compared with the corresponding facility, which disappears from the view window along with the map.

After the scroll is completed, the base time may expire without a new scroll instruction (see Step 235) or a new balloon icon specification (see Step 240). In such case, the balloon slant is initialized (see Step 255).

Even after the scroll terminates, the balloon moved with the map can stay in the view for a while. This provides room for the user to confirm the balloon well.

After the scroll terminates, the user may specify the balloon icon 35, 38, or 41 (see Step 240) in the view window before the base time expires (see Steps 230 and 250). The vehicle navigation system 1 scrolls the map (see Step 245) so that the facility corresponding to the specified balloon icon is centered in the view window. The vehicle navigation system 1 then initializes the balloon gradient (see Step 255).

When the view window shows the balloon icon corresponding to a facility outside the view window, the user can easily view the facility position by specifying the corresponding moving image.

Second Embodiment

A second embodiment of the invention will be described. The vehicle navigation system 1 according to the embodiment differs from the first embodiment in two points.

Firstly, the control circuit 19 according to the second embodiment can change a map scroll speed on the image display apparatus 12. The scroll speed denotes a distance per unit time for moving the map displayed in the view window. The distance may signify a display-based distance or a virtual distance represented by the map. For instance, a scroll speed according to the display-based distance is identical independently of scales of the map display as long as a point on the map scrolls from the left end to the right end within a given time.

Specifically, when detecting a scroll instruction at Step 205, the control circuit 19 sets a scroll speed based on the instruction. As an example, the control circuit 19 specifies a high scroll speed when a touched position on the touch panel is distant from the view window center. As another example, the control circuit 19 may specify a high scroll speed when the touch panel is touched for a long time. As still another example, the control circuit 19 may specify a high scroll speed when the scroll button is pressed for a long time. The control circuit 19 scrolls the map at the scroll speed specified at Step 225.

Secondly, the control circuit 19 according to the second embodiment varies a balloon icon gradient and a rope icon length according to the scroll speed when a scroll instruction is detected. Specifically, at Steps 215 and 220, the control circuit 19 displays each balloon icon gradient changed to a direction reverse to the specified map scroll direction. As the scroll speed increases, the balloon icon gradient is changed so as to become parallel with a direction reverse to the map scroll direction. The length of each rope icon is based on the display screen size of the image display apparatus 12 (i.e., display-based length). The rope icon length increases as the scroll speed increases. Increasing the rope icon length is equivalent to increasing an interval between the balloon icon and the map coordinate of the corresponding facility with reference to the display screen size.

The control circuit 19 changes the balloon icon gradient and the rope icon length as follows. The RAM 16 or the external storage unit 18 records balloon icon gradients and rope icon lengths for facilities available in the current view window and its vicinity. At Step 215, the control circuit 19 changes the corresponding balloon icon gradient and rope icon length from the initial values to a more parallel direction reverse to the scroll direction. This direction approximates to being more parallel as the specified scroll speed increases. At Step 140 of the map display control program 100, the control circuit 19 reads the rope icon setting as well as the balloon icon gradient stored in the RAM 16 or the external storage unit 18. At Step 150, the control circuit 19 allows the image display apparatus 12 to display an icon having the read gradient and length.

Figure 8:
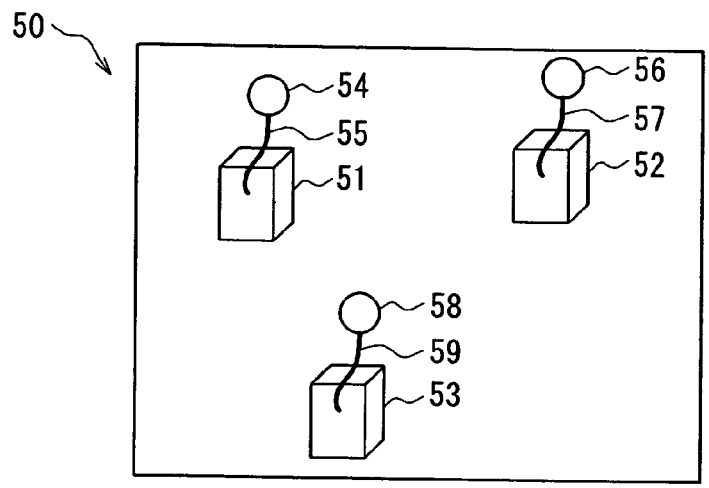
FIG. 8 exemplifies display of a map in a view window according to a second embodiment when no scroll is designated.
Figure 9:
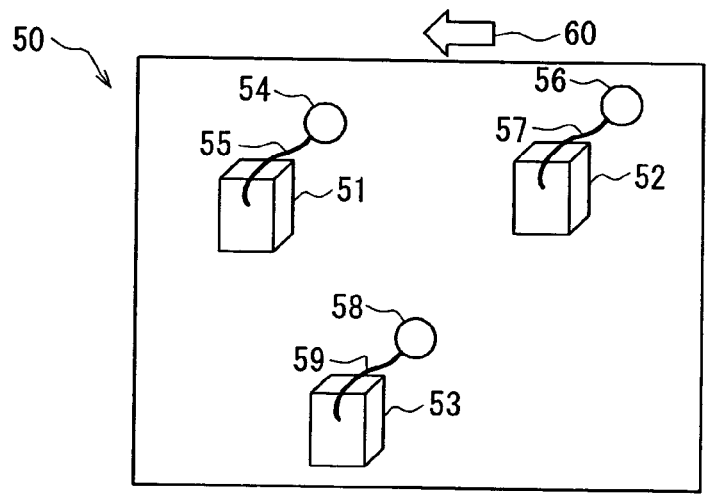
FIG. 9 exemplifies display of a map in a view window according to the second embodiment when a low-speed scroll is designated.
Figure 10:
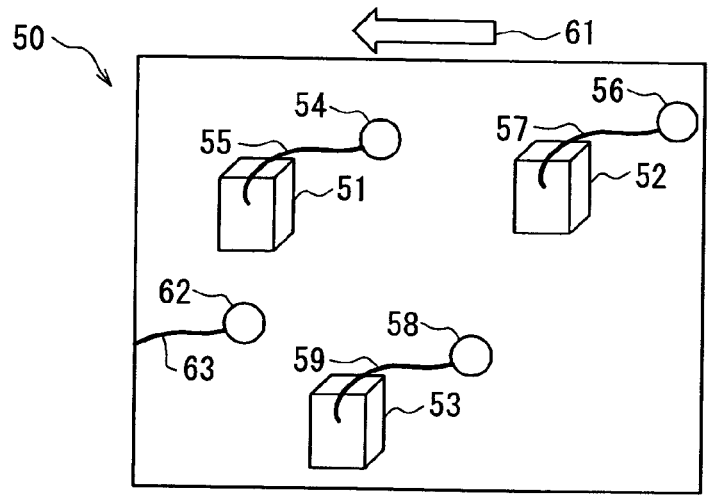
FIG. 10 exemplifies display of a map in a view window according to the second embodiment when a high-speed scroll is designated.

FIGS. 8 through 10 show map display examples in a view window 50 of the image display apparatus 12 for the vehicle navigation system 1 according to the embodiment. FIG. 8 shows a map display example in the view window 50 when no scroll instruction is specified. The map shows only facility icons 51 through 53, balloon icons 54, 56, and 58, and rope icons 55, 57, and 59 for simplicity. FIG. 9 shows a map display example in the view window 50 immediately after the control circuit 19 receives a low-speed scroll instruction at Step 205. FIG. 10 shows a map display example in the view window 50 immediately after the control circuit 19 receives a high-speed scroll instruction at Step 205. An arrow 60 in FIG. 9 and an arrow 61 in FIG. 10 represent scroll directions and speeds in the view window 50 for the respective drawings.

When no scroll instruction is provided as shown in these drawings, the balloon icons 54, 56, and 58, and the rope icons 55, 57, and 59 are positioned toward the top of the screen viewed from the corresponding facility icons 51 through 53. During a low-speed scroll, the balloon icons 54, 56, and 58, and the rope icons 55, 57, and 59 slightly slant in a direction reverse to the scroll direction as if a constant wind were blowing in a direction reverse to the scroll direction on the map. During a high-speed scroll, the balloon icons 54, 56, and 58, and the rope icons 55, 57, and 59 greatly slant in a direction reverse to the scroll direction as if a high wind were blowing on the map. The rope icons 55, 57, and 59 during the high-speed scroll become longer than those during the low-speed scroll.

According to the above-mentioned process of the control circuit 19, the vehicle navigation system 1 not only controls the scroll, but also moves the balloon icon in a direction reverse to the scroll direction. The travel distance increases as the scroll speed increases.

With reference to the view window, the balloon icon moves reversely to the scroll direction or moves in the scroll direction more slowly than the map. Accordingly, the view window can long display the balloon icon corresponding to the facility that is disappearing from the display screen in accordance with the scroll.

Except the image display apparatus 12, the remaining part of the vehicle navigation system 1 is equivalent to an example of a map display controller in the above-mentioned embodiments. The balloon icon and the flag icon are equivalent to examples of moving images. The rope icon is equivalent to an example of a connection image. The scroll control is equivalent to an example of a movement control. The view window is equivalent to an example of a display screen. The control circuit 19 executes the map display control program 100 to function as an example of display control means. The control circuit 19 executes the scroll control program 200 to function as an example of movement control means.

Other Embodiments

While there have been described specific preferred embodiments of the invention, it is to be distinctly understood that the present is not limited thereto but may include various forms capable of realizing the specific functions of the invention.

According to the above-mentioned embodiments, for example, the balloon icon indicates the facility name and the flag icon indicates the detailed information. Reversely, the balloon icon may indicate the detailed information and the flag icon may indicate the facility name.

Similarly to the second embodiment, the first embodiment may also vary the map scroll speed. Further similarly to the second embodiment, it may be preferable to increase the rope icon length, i.e., the distance between the balloon icon and the facility icon, in accordance with the map scroll speed.

It may be preferable to vary the rope icon length, i.e., the distance between the balloon icon and the facility icon, in accordance with the scale of a map to be displayed. For example, a short rope icon may be used when a wide-area map having a smaller scale is displayed. A long rope icon may be used when a detailed map is displayed. Even when a wide-area map displays many facilities, it is possible to prevent balloon icons from being complicated.

Independently of whether or not a destination is specified, a user may be able to use the operation unit 13 for scrolling whenever a map is displayed.

In the above-mentioned embodiments, the balloon icon gradients change at a time at the beginning of the scroll and remain unchanged afterwards during the scroll. However, the invention is not limited thereto. For example, the balloon icon gradients may gradually change according as the scroll progresses.

Each balloon icon gradient may vary with the type of the facility associated with the balloon icon.

The balloon icon gradient may vary in accordance with the type of an apparatus used to specify the scroll. When the map display controller detects a scroll instruction using the touch panel, for example, the balloon icon may be slanted toward the target center as described in the first embodiment. When the map display controller detects a scroll instruction using the remote controller or the system switch, the balloon icon may be slanted reversely to the scroll direction as described in the second embodiment.

The balloon icon may be slanted in accordance with not only the scroll resulting from a user operation on the operation unit 13, but also the scroll based on a change in the current position during a route guidance process.

It is not necessary to display balloon icons corresponding to all facility icons in the view window. For example, it may be preferable to display the balloon icon corresponding to only a facility icon matching the facility type specified for narrowing a range of destinations.

In the above-mentioned embodiments, the balloon icon gradient is reset after a lapse of the base time after the end of the scroll. The balloon icon gradient may be reset immediately after the scroll.

In the above-mentioned embodiments, the balloon icon, the flag icon, and the rope icon are displayed as a set. The invention is not limited thereto. For example, no balloon icon may be displayed and the flag icon and the rope icon may be displayed as a set. In this case, the flag icon is equivalent to a moving image example.

The facility icon may move with the map similarly to the balloon icon. It may be necessary to provide visual association between the facility icon position and the map coordinate for the facility location. In this case, the flag icon is equivalent to an example of a moving image.

A facility icon fixed to the map may not be necessarily displayed.

The moving image may be provided in any shape, not limited to a balloon or a flag. The connection image is not necessarily shaped into a rope. It is only necessary to ensure visual association between a facility position on the map and a corresponding moving image.

The connection image is not always needed when there is provided visual association between a fixed facility position on the map and a corresponding moving image. For example, an arrow may extend from the moving image to indicate the facility position on the map.

The display color or size of a moving image to be displayed may be changed in accordance with an importance of detailed information indicated in the moving image. For example, facility's fire information may be displayed large in intense color (e.g., red).

The display color or size of a moving image to be displayed may be changed in accordance with a facility category corresponding to the moving image.

In the above-mentioned embodiments, the moving image moves with the scroll relatively to the map. The moving image only needs to move with the movement control, i.e., the control of moving part of the map displayed in the view window along one direction on the map. The moving image does not necessarily move with only the movement control that causes continuous movement such as a scroll or causes stepwise movement in small units. For example, the moving image may move relatively to the map with such movement control that replaces the entire displayed map like browsing pages.

The moving image only needs to move out of synchronization with the map. The moving image does not necessarily move with the timing for the movement control. The moving image does not necessarily move in a direction that makes the moving image easily enter the view window. For example, a user may use the operation unit 13 to specify a given position in the view window independently of the movement control. In such case, moving images in the view window may move so as to radially become apart from the map coordinate corresponding to that position. The moving image may be displayed at a timing independently of the movement control (e.g., always) so as to move in an unstably floating manner relatively to the map.

The moving image may be visually associated with not only a facility, but also any position on the map. For example, the moving image may be associated with a fixed position where a fire or an accident occurred.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A map display controller for controlling an image display apparatus having a display screen that accepts a touch operation, the map display controller comprising:
   display control means for controlling displaying of
   (i) part of a map,
   (ii) a facility, which is fixed at a certain position on the map, and
   (iii) a moving image, which is associated with the facility fixed at the certain position on the map; and
   movement control means for moving, in response to a touch operation, the moving image in the display screen, relatively to the facility fixed at the certain position on the map, towards the part of the map displayed at a touched position where the touch operation is made in the display screen.

2. The map display controller of claim 1, wherein
   the movement control means moves the moving image easily in the display screen as though the moving image is carried on the wind.

3. The map display controller of claim 1, wherein
   the movement control means further provides movement control for moving a part of the map, which is displayed in the display screen, based on the touched position where the touch operation is made, along one direction on the map, and wherein
   when the facility which is associated with the moving image does not appear in the part of the map which is moved, based on the touched position, along one direction of the map, the movement control means moves the moving image so as to easily enter into the display screen when the part of the map is moved along the one direction.

4. The map display controller of claim 3, wherein
   the movement control means provides the movement control and moves the moving image in the one direction relatively to the map.

5. The map display controller of claim 3, wherein,
   when the movement control terminates and a base time elapses, the movement control means returns the moving image to a position on the map before initiation of the movement control.

6. The map display controller of claim 1, wherein
   the movement control means further provides movement control for moving the part of the map originally displayed where the touch operation is made to the center of the display screen, and wherein
   the movement control means moves the moving image so as to approach the center of the display screen.

7. The map display controller of claim 1, wherein,
   when a user specifies the moving image displayed in the display screen, the movement control means accordingly varies part of the map to be displayed in the display screen so that the display screen displays the certain position associated with the moving image on the map.

8. The map display controller of claim 1, wherein
   the display control means displays a rope-shaped connection image between the facility fixed at the certain position on the map and the moving image thereby visually demonstrating the association of the moving image with the facility fixed at the certain position on the map.

9. The map display controller of claim 1, wherein the display screen of the image display apparatus includes a touch panel which accepts the touch operation.

10. The map display controller of claim 1, wherein the moving image includes chronologically changing information about the facility.

11. The map display controller of claim 1, wherein, when the facility fixed at the certain position is moved outside of a part of the map displayed in the display screen, the moving image is moved so as to remain inside of the part of the map displayed in the display screen.

12. The map display controller of claim 11, wherein when the facility fixed at the certain position on the map is moved outside the part of the map displayed in the display screen, the moving image, which is moved so as to remain inside the part of the map displayed in the display screen, is displayed with a connection image which indicates a direction to the facility fixed at the certain position on the map.

* * * * *